Patented Dec. 23, 1952

2,623,007

UNITED STATES PATENT OFFICE 2,623,007

CATALYTIC DESULFURIZATION OF HYDROCARBONS

John W. Myers, Bartlesville, Okla., assignor to Phillips Petroleum Company, a corporation of Delaware No Drawing. Application August 30, 1949, Serial No. 113,250

4 Claims. (Cl. 196—28)

This invention relates to a process for desulfurizing a hydrocarbon in the presence of a chromia-alumina catalyst. In another of its aspects, this invention relates to a process for desulfurizing a hydrocarbon in the presence of a chromia-alumina-beryllia catalyst. In yet another of its aspects, this invention relates to a process for pretreating a chromia-alumina catalyst or a chromia-alumina-beryllia catalyst to increase its desulfurization efficiency and activity.

Most petroleum fractions contain more or less sulfur which ordinarily is present principally in the form of organic sulfur compounds comprising, in addition to minor amounts of hydrogen sulfide, such hydrocarbon sulfur derivatives as mercaptans, thioethers, thiophenes, thiophanes, etc. This class of sulfur compounds is generally objectionable on account of bad odor and also generally on account of corrosive tendencies either before or after combustion in internal combustion engines. Since it is common to desulfurize hydrocarbons containing high concentrations of sulfur compounds, say as much as 12%, it is important to secure a catalyst for the desulfurization reaction which will achieve a reduction of such large amounts of sulfur compounds below a desired maximum concentration. However, it is still more important to secure a catalyst which will efficiently catalyze the reduction of the sulfur content of a hydrocarbon stock containing very small amounts of sulfur, say less than 0.5%, to less than a maximum amount without incurring excessive treating costs inherent in multi-cycle catalytic desulfurization processes or in combination catalytic and chemical adsorption desulfurization processes. Furthermore, it is important that such catalyst possess a high degree of desulfurization efficiency and activity as well as a long catalyst life so that the treating costs of the hydrocarbons being desulfurized will be at a minimum figure.

According to this invention, it has been found that a hydrocarbon containing an organic sulfur compound can be efficiently desulfurized in a single pass process by contacting it at an elevated temperature with a chromia-alumina catalyst. Still according to this invention, it has been found that such a hydrocarbon can be efficiently desulfurized in a single pass process by contacting it at an elevated temperature with a chromia-alumina catalyst containing minor amonuts of beryllia. Still further according to this invention, it has been found that pretreating a chromia-alumina catalyst, or a chromia-alumina catalyst containing minor amounts of beryllia, with a hydrocarbon sulfur compound will greatly increase its desulfurization efficiency whereby the residual unconverted sulfur remaining in subsequently treated hydrocarbons will be much less than that remaining when employing such a catalyst which has not been pretreated.

Thus, according to this invention, a hydrocarbon which is to be desulfurized is contacted at an elevated temperature with a catalyst comprising chromia-alumina or, more preferably, with a chromia-alumina catalyst containing minor amounts of beryllia. Preferably, the catalyst is pretreated at an elevated temperature with a hydrocarbon sulfur compound whereby the catalytic efficiency of the catalyst is greatly improved and a hydrocarbon desulfurized in the presence of such a pretreated catalyst has a sulfur content substantially less than that achieved when employing the untreated catalyst.

Having set forth the invention, it will be more fully described now in its applied form, it being obvious, in any event, from the foregoing disclosure that chromia-alumina and chromia-alumina-beryllia catalysts are operative to effect desulfurization of hydrocarbon streams containing organic sulfur compounds and that with this information one skilled in the art can readily determine the conditions required by mere routine test.

The hydrocarbons to be desulfurized can comprise any refinery fraction which it is desired to treat, including such light hydrocarbons as butane, pentane, hexane, etc. as well as motor fuel cuts, cracking stocks, etc. When the fraction to be treated is normally liquid, it is preferable, although not essential, to treat the fraction in the vapor phase.

The temperature employed in the process of this invention depends on the stock being treated, the time of contact with the catalyst of the hydrocarbons to be desulfurized and upon other conditions such as pressure, sulfur content of feed, etc. Usually a temperature between 500° and 1300° F., preferably between 700° and 1100° F., and still more preferably between 750° and 1025° F., is employed. The exact operating temperature can readily be determined under any given set of conditions by mere routine test.

The pressure employed in the process is not critical and can range from 1 to 100 atmospheres, preferably from 1 to 10 atmospheres. It is ordinarily preferable, although not absolutely essential, to employ a pressure such that vapor phase conditions will obtain at the selected operating temperature.

The space velocity of the sulfur containing hydrocarbons contacting the catalyst is sufficient to secure adequate contact time therewith. Usually the space velocity can range from about 0.1 to about 20 liquid volumes of hydrocarbons per volume of catalyst per hour, preferably from about 0.5 to 5 volumes per volume of catalyst per hour. Hydrocarbon feeds containing large amounts of sulfur compounds will ordinarily require longer periods of contact with the catalyst than those with only small amounts of sulfur compounds. Also, the space velocity depends somewhat on the temperature employed, being higher for high temperatures than it is for low temperatures. In any event, the optimum space velocity can be determined by mere routine test.

The catalyst employed in the process of this invention is chromia-alumina or, more preferably, chromia-alumina containing small amounts of beryllia. The chromia-alumina catalyst of this invention is comprised of about 30 to about 50 per cent chromia and about 70 to about 50 per cent alumina; preferably from about 35 to about 45 per cent chromia and about 65 to about 55 per cent alumina. A preferred chromia-alumina-beryllia catalyst of this invention is comprised of 30 to 50 per cent chromia, 32 to 66 per cent alumina and 4 to 18 per cent beryllia; more preferably, the catalyst is comprised of about 35 to 45 per cent chromia, 43 to 59 per cent alumina and 6 to 12 per cent beryllia; still more preferably the catalyst is comprised of about 40 per cent chromia, about 50 per cent alumina and about 10 per cent beryllia. Generally, the most efficient chromia-alumina-beryllia catalyst is comprised of a major portion of alumina, a slightly smaller portion of chromia and a minor portion of beryllia.

The catalysts used in the process of this invention may be prepared by procedures known in the art. A mixture of the nitrates or other soluble salts of aluminum, chromium and beryllium in aqueous solution may be treated with an alkaline reagent, preferably ammonium hydroxide, to precipitate a mixture of the hydrous oxides. The hydrous oxides are recovered by filtration, dried, and ignited to the oxides. Another procedure comprises preparation of the hydrous oxides separately and subsequent mixing, drying and ignition. In another procedure the hydrosol of each hydrous oxide is prepared; the hydrosols are mixed and are converted to the hydrogels, which are subsequently converted to the oxides. Other known preparation methods may be used. The final catalyst may be used in the form of pellets or fragments for fixed bed operation or may be used in the form of a powder for fluidized catalyst operation.

Hydrogen can be admixed with the hydrocarbon to be desulfurized prior to its desulfurization in order to still further increase the desulfurization efficiency of the process. The amount of hydrogen introduced from outside sources will depend upon the amount of free hydrogen, if any, already present in the vapors and upon the character of the hydrocarbons and particularly upon the form of combination of the sulfur. As a general rule, the sulfur derivatives in which the sulfur atom is a member of a heterocyclic ring are the most difficultly decomposable and larger amounts of hydrogen along with the more efficient catalysts will be necessary when the oils contain high percentages of such compounds which include thiophene and its derivatives and homologs. Usually, hydrogen in the amount of 0.1 to 10, preferably 0.5 to 4, mols per mol of hydrocarbon is satisfactory.

It is an important feature of the present invention that the catalytic desulfurization efficiency of a chromia-alumina or of a chromia-alumina-beryllia catalyst can be greatly increased by pretreating the catalyst with a hydrocarbon sulfur compound before employing it in desulfurizing the regular hydrocarbon stocks. When employing such a pretreated catalyst, the residual sulfur content of the desulfurized hydrocarbon will usually be less than 50 per cent of the sulfur content of the same hydrocarbon which has been desulfurized with a non-pretreated catalyst. In pretreating the catalysts of this invention, a hydrocarbon sulfur compound is contacted at an elevated temperature with the catalyst to be pretreated for a period of time sufficient to increase the desulfurization activity of the catalyst to a maximum. The hydrocarbon sulfur compounds employed to pretreat the catalysts of this invention can be mercaptans, thiophenes, thiophanes, etc. It is usually desirable to dilute these sulfur compounds with other compounds such as hydrocarbons, e. g. naphtha, and/or nitrogen, hydrogen, carbon dioxide, etc. Thus, the pretreating agent can be synthetically prepared. However, it is preferred that a natural hydrocarbon stock containing hydrocarbon sulfur compounds be employed to pretreat the catalyst and that this stock be comprised of an ordinary sulfur containing hydrocarbon fraction such as a sour motor fuel, cracked distillate, etc., thereby avoiding the preparation of a special agent with which to pretreat the catalyst. It is still more preferable to employ in the pretreating step a hydrocarbon fraction which contains a higher sulfur content than the hydrocarbon fraction (containing 0.0005 to 12% sulfur) ordinarily desulfurized. Hydrocarbon fractions having a sulfur content between 0.0005 and 3 weight per cent, preferably between 0.05 and 0.5 weight per cent, are satisfactory.

In the pretreating step, the conditions employed will depend on the type of sulfur compound used, the type of material used as a diluent, the concentration of sulfur compounds, etc. Generally, the pretreatment conditions can be substantially within the same range as those described above for the ordinary desulfurization of hydrocarbons after the pretreating step except that the pretreating time is usually from 0.2 to 15, preferably from 0.5 to 5, hours depending on other conditions employed and the degree of increased catalytic efficiency desired. Ordinarily, pretreatment with a high concentration of sulfur compounds requires a short pretreating period and, hence, it is often advantageous to employ a pretreating mixture of high sulfur content.

After the catalyst has been in use for an extended period of time, the activity decreases as a result of carbon deposition on the surface. The catalyst is then reactivated by treatment with an oxygen containing gas at an elevated temperature to burn off the carbonaceous deposit. The oxidative regeneration is preferably followed by activation with an organic sulfur compound as previously described.

After contact with the desulfurization catalyst, the hydrocarbon feed is contacted with sodium hydroxide solution or with an alkanolamine reagent to remove hydrogen sulfide.

Example

A catalyst having the composition 40 weight per cent chromia-50 per cent alumina-10 per cent beryllia was treated with sulfur compounds in admixture with hydrocarbons at a sulfur concentration of 0.0174 weight per cent at three different sets of conditions. The products from two consecutive periods of the treatment were collected in separate portions and the sulfur contents of the hydrocarbon products consisting of those hydrocarbons which are normally liquid at 60° F. and atmospheric pressure were measured with the following results:

| Test number | 1 | 2 | 3 |
|---|---|---|---|
| Conditions of treatment: | | | |
| Temperature, °F | 754 | 999 | 1,013 |
| Pressure, atmospheres absolute | 1 | 21 | 1 |
| Space velocity of mixture, liquid volumes per volume of catalyst per hour | 3.1 | 2.7 | 3.0 |
| Hydrogen diluent, mols of hydrogen per mol of hydrocarbon | 0 | 2 | 2 |
| Length of first period, hours | 3.7 | 4.4 | 4.2 |
| Sulfur content of products from first period | 0.0048 | 0.0079 | 0.0085 |
| Length of second period, hours | 3.6 | 4.4 | 4.0 |
| Sulfur content of products from second period | 0.0028 | 0.0016 | 0.0031 |
| Total material deposited on the catalyst during both periods, weight per cent of the hydrocarbon-sulfur compound mixture passed over the catalyst | 0.09 | 0.03 | 0.25 |

These data show that in all three experiments, at different operating conditions, the sulfur content of the liquid products was lower after the first period which served as a pretreating period for the catalyst.

It is to be understood that wherever the terms "chromia," "alumina" and "beryllia" have been used herein, they are used to denote the oxides of chromium, aluminum and beryllium, respectively, as such oxides usually exist in a catalytic composition.

Variation and modification are possible within the scope of this disclosure and the appended claims to the invention the essence of which is that a hydrocarbon can be efficiently desulfurized in the presence of a chromia-alumina catalyst or, more preferably, a chromia-alumina catalyst containing minor amounts of beryllia and that the desulfurization efficiency of these catalysts can be substantially increased by pretreatment with a hydrocarbon sulfur compound.

I claim:

1. In a process for the catalytic desulfurization of a hydrocarbon fraction in the presence of a desulfurization catalyst consisting essentially of 30–50% by weight chromia, 32–60% by weight alumina, and 4–18% by weight beryllia, the improvement which consists pretreating said catalyst by contacting said catalyst at an elevated temperature with a vaporized treating material consisting essentially of a sulfur-containing compound selected from the group consisting of mercaptans, thiophenes and thiophanes and subsequently contacting said catalyst with said hydrocarbon fraction to be desulfurized.

2. In a process for the catalytic desulfurization of a hydrocarbon fraction in the presence of a desulfurization catalyst consisting essentially of 30–50% by weight chromia, 32–60% by weight alumina, and 4–18% by weight beryllia the improvement which consists pretreating said catalyst by contacting said catalyst for a period of time within the range 0.2 to 15 hours at a temperature in the range 500–1300° F., at a pressure in the range 1–100 atmospheres with a vaporized mixture consisting essentially of a sulfur-containing compound selected from the group consisting of mercaptans, thiophenes and thiophanes and containing as a diluent therein a gas selected from the group consisting of hydrogen, nitrogen and carbon dioxide, said mixture containing 0.0005 to 12% by weight sulfur, and subsequently contacting said catalyst with said hydrocarbon fraction to be desulfurized.

3. In a process for the catalytic desulfurization of a hydrocarbon fraction in the presence of a desulfurization catalyst consisting essentially of 30–50% by weight chromia, 32–60% by weight alumina, and 4–18% by weight beryllia, the improvement which consists pretreating said catalyst by contacting said catalyst for a period of time within the range 0.2 to 15 hours at a temperature in the range 500–1300° F. at a pressure in the range 1–100 atmospheres with a vaporized mixture consisting essentially of a sulfur-containing compound selected from the group consisting of mercaptans, thiophenes and thiophanes and containing as a diluent therein hydrogen, said mixture containing 0.0005 to 12% by weight sulfur and subsequently contacting said catalyst with said hydrocarbon fraction to be desulfurized.

4. In a process for the catalytic desulfurization of a hydrocarbon fraction in the presence of a desulfurization catalyst consisting essentially of 40% by weight chromia, 50% by weight alumina and 10% by weight beryllia the improvement which consists pretreating said catalyst by contacting said catalyst for a period of time within the range 0.2 to 15 hours at a temperature in the range 500–1300° F. at a pressure in the range 1–100 atmospheres with a vaporized mixture consisting essentially of a sulfur-containing compound selected from the group consisting of mercaptans, thiophenes and thiophanes and containing as a diluent therein a gas selected from the group consisting of hydrogen, nitrogen and carbon dioxide, said mixture containing 0.0005 to 12% by weight sulfur, and subsequently contacting said catalyst with said hydrocarbon fraction to be desulfurized.

JOHN W. MYERS.

REFERENCES CITED

The following references are of record in the file of this patent:

UNITED STATES PATENTS

| Number | Name | Date |
|---|---|---|
| 2,301,802 | Burk et al. | Nov. 10, 1942 |
| 2,325,911 | Huffman | Aug. 3, 1943 |
| 2,411,829 | Huffman | Nov. 26, 1946 |
| 2,426,118 | Parker et al. | Aug. 19, 1947 |
| 2,486,361 | Nahin | Oct. 25, 1949 |
| 2,498,559 | Layng et al. | Feb. 21, 1950 |
| 2,536,085 | Pitzer | Jan. 2, 1951 |